Figure 1:
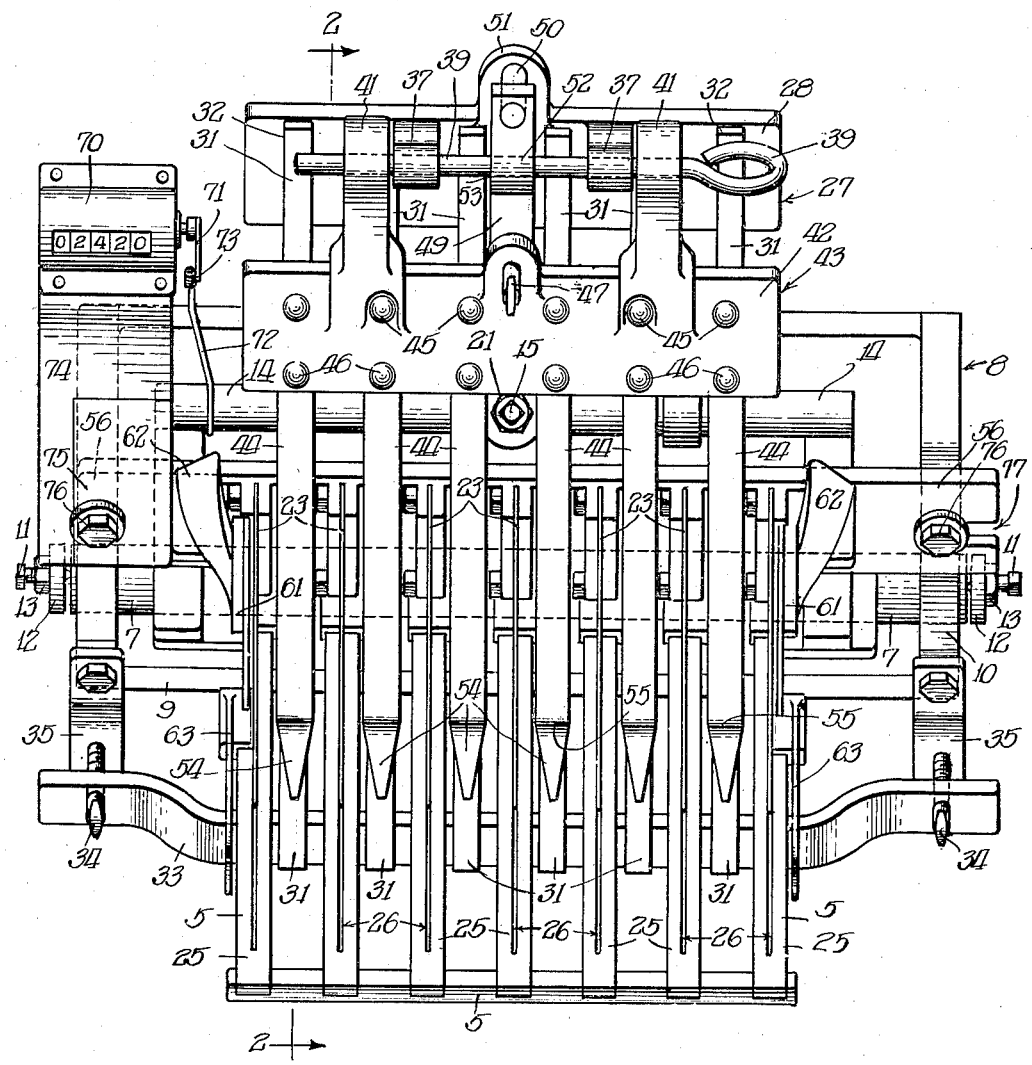

May 6, 1941.  H. F. NYGARD  2,240,796
BAND TRIMMING OR CUTTING MACHINE
Filed June 19, 1939  2 Sheets-Sheet 1

May 6, 1941.　　　　H. F. NYGARD　　　　2,240,796
BAND TRIMMING OR CUTTING MACHINE
Filed June 19, 1939　　　2 Sheets-Sheet 2

INVENTOR.
Halvard F. Nygard,
BY John A. Marzall
ATTORNEY.

Patented May 6, 1941

2,240,796

UNITED STATES PATENT OFFICE 2,240,796

BAND TRIMMING OR CUTTING MACHINE

Halvard F. Nygard, Madison, Wis., assignor to The Celon Company, Madison, Wis., a corporation of Wisconsin Application June 19, 1939, Serial No. 279,808

13 Claims. (Cl. 164—38)

This invention relates to a trimming machine or apparatus for trimming or cutting articles to a predetermined length or size, and the primary object of the invention is the provision of new and improved means for cutting bottle bands of a predetermined length from an elongated or endless tube of regenerated cellulose in its hydrated state.

A further object of the invention is the provision of a trimming or cutting machine, apparatus or device, having new and improved means for making a plurality of cuts through a tube of flexible, soft, plastic material, such as hydrated regenerated cellulose, whereby a plurality of bottles or other container bands are cut simultaneously from the continuous tube during one operation of the machine.

Another object of the invention is the provision of a new and novel machine for cutting a plurality of bands from an elongated or continuous tube of regenerated cellulose or like material of a soft, flexible, plastic nature, whereby the bands are cut from the tube by forcing the material upwardly against a gang of spaced knives, there being guideways or supports for supporting the cut material in stacked relationship, each cut on the tube causing the pile or stack of bands on each support or guideway to be shifted upwardly, the last cut band being on the bottom of the stack.

Still another object of the invention is the provision of a cutting or trimming device having new and novel means provided for cutting or severing a tube into a plurality of equal lengths, there being means provided for supporting stacked rows of cut bands, the stacks being formed by the forcing of the last cut band onto the bottom of the stack, moving the stacks upwardly during the cutting operation, and means for supporting and holding the stacks in proper position and relationship whereby the bands may be easily removed in stacks or tiers.

A still further object of the invention is the provision of a cutting machine provided with new and improved means for simultaneously cutting a plurality of bands of predetermined lengths by a single operation of the machine, the machine having numerous adjustments whereby bands of various widths may be cut from a tube of the material, there being safety means provided to protect the hands of the worker while operating the machine.

Still another object of the invention is a plurality and association of parts, the manner in which the parts are correlated and arranged so as to cut simultaneously a plurality of caps of predetermined lengths from a continuous tube of material, and to operate a counter so as to determine easily the number of operations or strokes the machine has made, thereby determining the number of caps which have been cut from the tube.

Another object of the invention is the provision of the method of cutting bands from a long or continuous flattened tube of material by cutting a plurality of bands from the material and causing the bands to be arranged in stacked relationship, the last cut band being arranged on the bottom of the stacks which are progressively moved upwardly along a band supporting structure because of the operation of the machine.

Numerous other objects and advantages will be apparent throughout the progress of the following specification.

Figure 2:
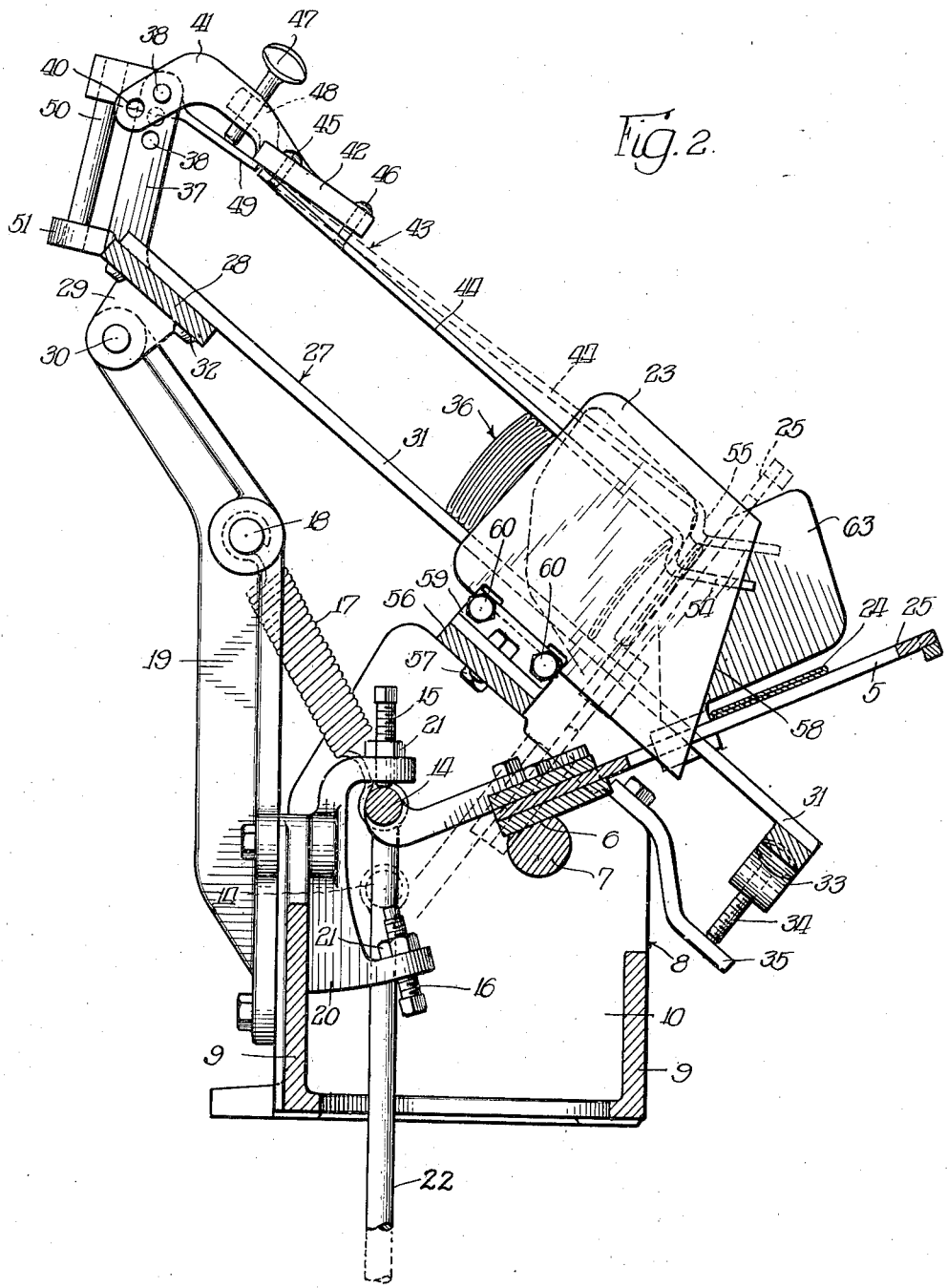

The accompanying drawings illustrate a selected embodiment of the invention, and the views therein are as follows:

Fig. 1 is a detail top plan view of the improved machine, apparatus or device; and Fig. 2 is a detail vertical sectional view on the line 2—2 of Fig. 1.

The particular machine herein shown for the purpose of illustrating the invention comprises a material support or supporting rack 5, which is rigidly fixed, as indicated at 6, Fig. 2, to a transverse bar or shaft 7. This shaft or bar 7 is freely supported in a supporting structure or frame 8 rigidly secured to the base 9, the same extending through the side plates 10 of the frame and having its ends supported by pins or trunnions 11 threadedly engaging brackets 12, Fig. 1, which are fixed at the side of the frame or supporting structure 8. The trunnions 11 comprise members which are threadedly received in the brackets 12, and the pointed ends engage conical shaped recesses in the end of the shaft 7 so as to provide a positive bearing. The members 11 also permit axial or longitudinal adjustment of the shaft 7, being maintained in locked or adjusted position by means of nuts 13. A rear bar 14 is also rigidly connected to the transverse shaft or bar 7 and is urged in an upward direction against a stop pin 15 by springs 17 which are fastened to the bar 14 and to a cross-bar 18 on an upwardly extending rear bracket 19. The springs 17, therefore, tend to urge the bar 14 upwardly, thereby tending to move the forward end of the supporting member 5 downwardly. However, the upward movement of the shaft or bar 14 is limited in an upward direction by the stop pin 15. The downward movement of this bar is limited by the lower stop pin 16. The stop pins 15 and 16 threadedly engage a bracket member 20 fastened to part of the base 9, Fig. 2. The stop pins 15 and 16 threadedly engage the bracket member 20 so as to limit the movement of the bar 14 in both an upward and downward direction. As these pins are screw-threaded, the amount of movement is variable because of this adjustment. The stop pins 15 or 16 are locked in adjusted position by means of lock nuts 21, Fig. 2. The bar or rod 22 is connected to the cross-bar 14 and to a foot pedal (not shown) so that when the foot pedal is operated, by stepping upon the same, the bar 14 will be pulled down from the position shown in full lines in Fig. 2 to the position shown in dotted lines. This movement of the bar 14 will cause the material support or supporting rack 5 to be moved upwardly against a gang of spaced cutting knives 23 so as to cut substance 24 on the material support 5, Fig. 2.

This material support or supporting rack 5 comprises a plurality of spaced-apart metal strips or fingers 25 which are provided with elongated narrow slots 26, through which the knives 23 are adapted to extend. Thus, when the tubular material 24, which is flattened, as clearly shown in Fig. 2, is placed on the material support or supporting rack 5, and the pedal operated to pull down the bar 14, the supporting rack 5 will move upward, bring the material into engagement with the thin, sharp knives 23, and the material will be cut by each of the knives 23 to make bands of a predetermined length, depending upon the spacing of the knives in the fingers 25. The operation of the foot pedal pulls down the bar 22, and as the rod 22 is connected to the cross-bar 14, it will pull the bar 14 downwardly against the tension of the springs 17. Upon release of the foot pedal, the springs 17 will return the supporting rack 5 to its original supporting position, at which time the operator will move the continuous flat tube 24 into position to be again cut by the knives. As the bands are cut from the tube, they will be supported by a pivotally mounted, adjustable band support or rack 27. This material supporting member 27 comprises a transverse bottom supporting plate 28 which is provided with spaced-apart, downwardly extending ears 29, Fig. 2. The ears 29 are provided with openings to receive a transverse bar or pin 30 which extends through an opening in a bearing formed on the end of the bracket member 19, whereby the band support or rack 27 is free to move vertically about the axis or pivot 30. The spaced longitudinal fingers 31 are fixed at their upper ends to the plate 28, as indicated at 32, Fig. 1, and extend downwardly between the knives 23 and between the fingers 25 of the material support or supporting rack 5. The lower ends of these rods or fingers 31 are fixed to a transverse bar or strap 33 which is in the form of an arch, as clearly shown in Fig. 1. Set screws 34, Fig. 1, threadedly engage openings at the ends of the strap 33 and engage a part of the frame or an attachment thereto 35, whereby the band support or rack 27 is limited in its downward movement by the engagement of the set screws with the member 35, but is adapted to be adjusted upwardly and downwardly by the set screws 34. The rack 27 is therefore adapted to support a stack of bands 36, Fig. 2, as they are cut from the flattened tube of material 24, the same being supported on the fingers 31 after the cutting operation.

The band support or rack 27 is provided with upstanding integral fingers or supports 37, Fig. 2, and are provided with a plurality of spaced openings 38. A rod or pin 39, Fig. 1, passes through one of the holes 38 of the members 37 and through corresponding holes 40 provided in tailpieces 41 on the supporting plate 42 of the band engaging comb or frame 43. The engaging comb or frame 43 is thereby pivotally mounted to the band support or rack 27 by means of the pin 39 extending through the alined holes 38 and 40 in the members 37 and 41 respectively. This frame or comb 43 includes a plurality of downwardly extending longitudinal fingers 44 which are parallel to the rods or fingers 31, but spaced a predetermined distance thereabove, as clearly shown in Fig. 2. The fingers 44 are loosely connected to the plate 42 by bolts or rivets 45 and 46 but are free to have limited movement with respect to the plate 42, the lower rivet 45 being longer than the upper rivet 46 and having its under peened face engageable with the bottom of a finger so as to permit movement of the finger from full line position to dotted line position shown in Fig. 2. Therefore, while the entire comb or frame 43 has free pivotal movement on the pin 39, the fingers 44 have limited free movement by means of the loose connection with the plate 42 by the rivets 45 and 46. The downward movement of the comb or frame 43 is limited by a set screw 47 which threadedly engages an ear 48, rigid with the plate 42, and a bottom lug or tongue 49 which is made rigid with a vertical pin 50, which is slidably mounted in an ear 51, rigid with the transverse plate 28. The lug or tongue 49 is enlarged, as indicated at 52, Fig. 1, and has a transverse hole 53 extending therethrough to receive the pin 39. Thus while the entire comb has free movement on the pin 39, the comb or frame has vertical arcuate adjustable movement about the same pin 39 by the set screw 47. Therefore, the downward position of the fingers 44 can be raised or lowered with respect to the rods 31 by manual operation of the set screw 47. Moreover, due to the connection of the comb or frame 43 to the plate 28, the band support or rack 27 and the comb or frame 43 are free as a unit to pivot about the transverse bar 30. At the same time, the comb or frame 43 has free arcuate movement with respect to the band support or rack 27 because of the separate pivotal connection of the comb or rack to the pin 39. Moreover, the comb or frame 43 is further adjustable with respect to the band support or rack 27, because the pin 39 may be positioned in any one of the holes 38, 40 so as to effect the proper adjustment and height of the comb or frame 43 with respect to the band support or rack 27. When the pin 39 is placed in the alined holes 38 and 40 in the members 37 and 41, respectively, it will also pass through the hole 53 in the enlarged portion 52, whereby the tongue 49 will always be free for limited vertical arcuate adjustment by the set screw 47. In such cases where the comb or frame 43 is adjusted by changing the position of the pin 39 in alined holes 38 and 40, the fine adjustment of the comb or frame 43, by operation of the set screw 47, can still be made because the tongue 49 is always in the same relative position as regards the ear 48, as there is only one hole in the enlarged portion 52. The tongue, therefore, is always adjacent the transverse plate 42 so as to permit fine adjustment by operation of the set screw 47.

The fingers 44 are reduced in width and terminate in pointed sections 54, Fig. 1, these sections being offset by an integral connecting portion 55, Fig. 2.

The knives 23 are mounted on a transverse bar 56 which is rigidly attached to the frame by means of nuts 57. These knives are made of very thin material and of relatively large size, as clearly shown in Fig. 2. The forward edge 58 of each knife is inclined, as shown in Fig. 2, and extends through a slot 26 formed in the fingers 25 of the material support or supporting rack 5. These knives are in reality maintained under tension because of their extending into the slots 26, and therefore when bands are cut from the material, they will be stacked automatically between adjacent knives. The cut bands, therefore, while being supported on the rack 27, will be stacked between the blades and maintained in straight, neat piles and stacks, retained in position by being set between spaced angles 59, Fig. 2, locked together by set screws 60. Side plates 61, Fig. 1, are mounted on brackets 62 fastened on the knife supporting crossbar 56, and are adapted to engage the outer surface of the outer knives to prevent these outer knives from spreading during normal cutting operation of the device. Also, guide flanges 63, Fig. 1, are fastened on each side of the material support or supporting rack 5 so that the operator's fingers are protected from the knives during the operation of the material support or supporting rack when it is moved to cutting position against the knives.

A counter 70, Fig. 1, is mounted on a part of the framework of the machine and has a counting lever or finger 71 to which an operating lever 72 is attached. The operating lever 72 is connected to the crossbar 14 so that when this bar is moved, by stepping on the foot pedal, the counting finger 71 will be operated to operate the counter 70. A spring 73 may be interposed between the member 72 and the finger 71 to provide resilient operation of the counter. This counter 70 may be mounted on a strip or plate 74, Fig. 1, fixed to a part of the frame to provide a flat surface upon which a sheet of paper or other element may be mounted to mark down the numbers of the counter and thereby keep a line of demarcation between bands of different color, sizes and the like. A flexible leaf spring member 75 may be fastened on the plate 74 by the same nut 76 which fastens the plate 74 to the frame, whereby to provide a locking clip for supporting the counting or tabulating sheet. The transverse bar 56, Fig. 1, is fastened in position to the frame by means of set screws 76, 76, there being lateral adjustment permitted because of the slots 77, Fig. 1, formed on each end of the cross member 56.

The fingers 44 being offset, as indicated at 55, Fig. 2, are free to extend over the edge of the last cut band and hold the stack in position on the band support 27, as shown in Fig. 2. When the bands are cut from the material, they are received under the forward extending lip 54, and upon movement of the band support 27, are pressed upwardly, whereby all the stacks of bands 36 are moved upwardly along the band support 27. The offset 55 engages the last cut or lowermost band and prevents the bands on each stack from being carried away by the material support 5 during its downward movement, or from becoming displaced because of frictional engagement along the sides of the knives or blades 23. The fingers 44 have limited free movement in an upwardly and downwardly direction, as shown in Fig. 2, so that the only drag or weight on the stack of the bands is the weight of the fingers themselves.

*Operation*

In operation, the tube of hydrated regenerated cellulose, or other like pliable material, is positioned on the material support 5 and between the guide flanges 63. The operator then steps on the foot pedal, causing the rod 22 to move downwardly. As the rod 22 is connected to the cross shaft or bar 14, the bar 14 is pulled downwardly by the pedal operation. Downward movement of the bar 14 will cause upward swinging movement of the material support or rack 5, whereby the material 24 on the support 5 will be moved through the spaced knives 23 and be cut in the proper lengths. When the material support 5 is moved upwardly because of the pedal operation, the upper edge of the material 24 (to the upper right hand edge, Fig. 2) will engage the under edge of the upwardly inclined portion 54 of the fingers 44 and raise these fingers a predetermined distance until the band is received under the offset 55. Downward movement of the bar 14 will also operate the counter 70 so that each upward or cutting stroke of the material support 5 will be registered. Upon release of the foot pedal, the springs 17 will return the material support 5 to normal position. The vertical or arcuate movement of the material support 5 about its pivot 7 may be adjusted by the set screws 15, 16. This adjustment is desirable so as to insure material of different widths being properly cut by the knife or to compensate for the knives of different sizes. Moreover, the band support or rack 27 is free for vertical arcuate adjustment about its pivot 30 by means of the set screw 34. This adjustment also is desirable to insure the use of tubes of various widths and to effect a proper adjustment with respect to the knives 23. The fingers 44 are likewise adjustable by the operation of the set screw 47. This adjustment, however, is a relatively fine adjustment, the main adjustment being effected through the placing of the transverse rod 39 through the holes 38 and 40 in the members 37 and 41 respectively.

The invention provides a positive and efficient operating band cutting or trimming machine, which is safeguarded to protect the operator, and which is capable of numerous adjustments whereby a practically universal machine is provided. The machine, moreover, is inexpensive in construction and is made of few and simple parts which are not likely to get out of order. Moreover, a plurality of bottle or other container bands can be cut from a long or continuous tube of material, many bands being cut in a single operation. After the bands are cut, they are supported on the band support whereby they can be readily removed in stacked formation. Inasmuch as the counter operates during each cutting stroke of the machine, the operator knows the number of bands which are cut by the machine. Therefore, the stacks may be arranged in the preserving fluid, if they are to be kept in the hydrated state, all the bands being cut to the exact proper length and arranged in proper stacked relationship so as to facilitate easy handling. It is to be understood, of course, that the machine is capable of being automatically operated instead of manually by the foot pedal. Automatic operation can be carried out in many ways, such as by operating the rod 22 or the bar 14 by electrically controlled mechanism, or by some other mechanical construction adaptable for such use. Automatically or mechanically controlled mechanism or instrumentality could operate the machine, and the mechanism could be operated by a push-button or lever, so that when the lever or push-button is pressed downward, movement of the rod 22 will ensue, or the device could be caused to operate automatically, such as when a counter reaches a certain amount or when the material is cut or arranged.

The method of cutting and forming bands from the continuous tube is one of simplicity and economy and is unique in that it causes the bands to be properly stacked, held in position by continuous placement of a band on the bottom of the stack and continuously forcing the stack upwardly.

Changes may be made in the form, construction and arrangement of the device, and the method may be operated within certain limits without departing from the spirit of the invention or sacrificing any of its advantages, and the right is hereby reserved to make all such changes as fairly fall within the scope of the following claims.

The invention is hereby claimed as follows:

1. A machine for cutting a plurality of predetermined lengths from a length of material at a single operation and comprising a support upon which the length of material is supported, a plurality of spaced apart knives for cutting the length of material into a plurality of predetermined cut lengths at a single operation, a material supporting rack to support the cut lengths in spaced relationship, there being relative movement between the knives and the rack to cut the material into said plurality of predetermined lengths, means for maintaining the cut lengths of material in a plurality of stacked piles.

2. A machine for cutting predetermined lengths from a length of material comprising a support upon which the length of material is supported, a plurality of spaced apart knives for cutting the length of material into predetermined cut lengths, a material supporting rack to support the lengths of material cut, there being relative movement between the knives and the rack to cut the material into said predetermined lengths, means for maintaining the cut material between knives in stacked piles on the article support, and article engaging fingers arranged between knives to engage the lowermost articles cut and support and hold them in stacked formation.

3. A machine for cutting predetermined lengths from a length of material comprising a support upon which the length of material is supported, a plurality of spaced apart knives for cutting the length of material into predetermined cut lengths, a material supporting rack to support the lengths of material cut, there being relative movement between the knives and the rack to cut the material into said predetermined lengths, means for maintaining the cut material between knives in stacked piles on the article support, a plurality of movable fingers engaging the last cut lengths and supporting said lengths beneath previous cut lengths, whereby the articles will be arranged in stacked rows, and means for limiting the movement of said fingers.

4. A machine for cutting predetermined lengths from a length of material comprising a support upon which the length of material is supported, a plurality of spaced apart knives for cutting the length of material into predetermined cut lengths, a material supporting rack to support the lengths of material cut, there being relative movement between the knives and the rack to cut the material into said predetermined lengths, means for maintaining the cut material between knives in stacked piles on the article support, said support being provided with a plurality of slots into which the knives are adapted to extend during the cutting operation, a frame arranged above the support, movable fingers connected to said frame and means for limiting the movement of said fingers.

5. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, and a movable material supporting member arranged below the knives and adapted to be swung upward into cutting relationship with the knives to cut the bands, said bands being arranged in spaced stacks on the band support, the last cut band being on the bottom of a stack.

6. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, and a movable material supporting member arranged below the knives and adapted to be swung upward into cutting relationship with the knives to cut the bands, said bands being arranged in spaced stacks on the band support, the last cut band being on the bottom of a stack, said material support, when moved to cutting position, facing the stacks upwardly along the band support a distance equal to the thickness of the material being cut.

7. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, a movable material supporting member arranged below the knives and adapted to be swung upward into cutting relationship with the knives to cut the bands, said bands being arranged in spaced stacks on the band support, the last cut band being on the bottom of a stack, and means engageable with the cut bands in the stacks to hold the bands on the band support.

8. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, a movable material supporting member arranged below the knives and adapted to be swung upward into cutting relationship with the knives to cut the bands, said bands being arranged in spaced stacks on the band support, the last cut band being on the bottom of a stack, said material support, when moved to cutting position, facing the stacks upwardly along the band support a distance equal to the thickness of the material being cut, and means engageable with the cut bands in the stacks to hold the bands on the band support and to prevent the cut bands from remaining on the material support when the material support is moved away from the knives.

9. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, and a material supporting rack to receive the material to be cut, said rack being movable toward the knives to bring the material into cutting relationship therewith, said rack being pivotally mounted to a part of the machine frame, and means to adjust the movement of said rack.

10. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, a material supporting rack to receive the material to be cut, said rack being movable toward the knives to bring the material into cutting relationship therewith, means to hold the cut bands on said band support in stacked relationship, said material supporting rack being pivotally mounted to a part of the machine frame, and means for adjusting the movement of said rack.

11. A machine for cutting pliable material into predetermined lengths from a long flattened tube to form sealing bands therefrom and comprising a band support to receive and hold the bands in stacked relationship after they are cut, a plurality of spaced-apart knives for cutting the tube into such predetermined lengths, and a material support for the material to be cut, said material support being provided with a plurality of slots into which the knives are adapted to extend, and a plurality of spaced fingers on the material support and adapted to engage a last cut band to hold the stacks of cut bands.

12. A machine comprising a frame, a material support having a plurality of spaced rods provided with longitudinal slots therein, knives extending into said slots, there being relative movement between the knives and support to cut material on said support, spaced movable fingers arranged above but between said knives to support a last cut piece of material on the material support between knives whereby the cut material will become arranged in stacks, means to adjust the support, and means to limit the movement of said fingers.

13. The method of cutting bands from a tube of plastic material which consists in positioning the tube of material on a support, simultaneously cutting a plurality of lengths of a predetermined size from said tube to form bands, forcing the cut bands under previously cut bands to form stacks, supporting the bands in stacked rows and simultaneously moving all bands in all stacks during the cutting operation and supporting the undermost bands to maintain the stacks in position.

HALVARD F. NYGARD.